(12) United States Patent
Ohta

(10) Patent No.: US 10,486,593 B2
(45) Date of Patent: Nov. 26, 2019

(54) IN-VEHICLE ALERT APPARATUS

(71) Applicant: TOYOTA JIDOSHA KABUSHIKI KAISHA, Toyota-shi, Aichi-ken (JP)

(72) Inventor: Teppei Ohta, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/852,630

(22) Filed: Dec. 22, 2017

(65) Prior Publication Data

US 2018/0178722 A1    Jun. 28, 2018

(30) Foreign Application Priority Data

Dec. 26, 2016   (JP) ................... 2016-250554

(51) Int. Cl.
*B60Q 9/00*    (2006.01)
*G06T 7/593*    (2017.01)
(Continued)

(52) U.S. Cl.
CPC ........... *B60Q 9/008* (2013.01); *B62D 15/025* (2013.01); *G01S 13/08* (2013.01); *G01S 13/867* (2013.01); *G01S 13/87* (2013.01); *G01S 13/931* (2013.01); *G06K 9/00805* (2013.01); *G06T 7/593* (2017.01); *G06T 7/70* (2017.01); *B62D 15/021* (2013.01); *G01S 13/726* (2013.01); *G01S 2013/9375* (2013.01); *G01S 2013/9389* (2013.01); *G06T 2207/10012* (2013.01); *G06T 2207/30261* (2013.01)

(58) Field of Classification Search
CPC .......... B60Q 9/008; G06T 7/70; G06T 7/593; G06T 2207/10012; G06T 2207/30261; B62D 15/025; G01S 13/08; G01S 13/867; G01S 13/87; G01S 13/931; G01S 13/726; G01S 2013/9375; G01S 2013/9389

See application file for complete search history.

(56) References Cited

U.S. PATENT DOCUMENTS

| | | | |
|---|---|---|---|
| 2009/0088925 A1* | 4/2009 | Sugawara | B60W 30/12 701/41 |
| 2012/0027258 A1* | 2/2012 | Uchida | G06K 9/00805 382/103 |
| 2014/0037138 A1* | 2/2014 | Sato | G08G 1/166 382/103 |

FOREIGN PATENT DOCUMENTS

JP    2010-102641 A    5/2010

* cited by examiner

*Primary Examiner* — Steven Lim
*Assistant Examiner* — Mancil Littlejohn, Jr.
(74) *Attorney, Agent, or Firm* — Hunton Andrews Kurth LLP

(57) ABSTRACT

An in-vehicle alert apparatus includes an electronic control unit. The ECU configured to estimate a predicted traveling course of a center point in a vehicle width direction of a host vehicle based on vehicle status information, extract an object having a possibility of colliding with the host vehicle as an obstacle, calculate an index value that is changed in accordance with a degree of need for an alert operation which alerts a driver to each extracted obstacle, select a processing target obstacle from the extracted obstacles by using the index value calculated for each extracted obstacle, determine whether a specific condition is established in accordance with a result of comparison between the index value for the processing target obstacle and a predetermined threshold, and display an alert screen on a display unit when the specific condition is determined to be established.

8 Claims, 8 Drawing Sheets

(51) Int. Cl.
*G06T 7/70* (2017.01)
*G01S 13/08* (2006.01)
*G01S 13/86* (2006.01)
*G01S 13/87* (2006.01)
*B62D 15/02* (2006.01)
*G01S 13/93* (2006.01)
*G06K 9/00* (2006.01)
G01S 13/72 (2006.01)

IN-VEHICLE ALERT APPARATUS

INCORPORATION BY REFERENCE

The disclosure of Japanese Patent Application No. 2016-250554 filed on Dec. 26, 2016 including the specification, drawings and abstract is incorporated herein by reference in its entirety.

BACKGROUND

1. Technical Field

The present disclosure relates to an in-vehicle alert apparatus that extracts an obstacle having a possibility of colliding with a host vehicle and alerts a driver to the obstacle by using a display unit.

2. Description of Related Art

One of such types of in-vehicle alert apparatuses known in the related art (hereinafter, referred to as an "apparatus in the related art") calculates a time-to-collision (TTC) before collision between an obstacle and a host vehicle and alerts a driver to the obstacle of which the time-to-collision is less than or equal to a threshold. The apparatus in the related art is configured to preferentially set a body moving in the lateral direction in front of the host vehicle (for example, an intersecting vehicle that temporarily stops at an intersection and then enters the intersection) as an alert target, over a body being present within a range easily recognized by the driver (operator). Specifically, the apparatus in the related art sets the threshold to a larger value for a body determined to be a laterally moving body than the threshold for a body not determined to be a laterally moving body (refer to, for example, Japanese Unexamined Patent Application Publication No. 2010-102641 (JP 2010-102641 A)).

SUMMARY

When a plurality of obstacles is present within the range easily recognized by the driver, the obstacle having the minimum time-to-collision is selected as a processing target obstacle to which the driver is alerted. However, the obstacle having the minimum time-to-collision is not always the obstacle having the highest possibility of colliding with the host vehicle. For example, even when an "obstacle having a short distance to a predicted traveling course of the host vehicle" and an "obstacle having a long distance to the predicted traveling course of the host vehicle" have the same time-to-collision, the obstacle having a short distance to the predicted traveling course of the host vehicle has a relatively high possibility of colliding with the host vehicle.

Thus, even when the obstacle having the minimum time-to-collision is selected as the processing target obstacle, and the driver is alerted to the obstacle, the driver may not be alerted to the obstacle having a higher possibility of colliding with the host vehicle.

The apparatus in the related art does not select the processing target obstacle by considering the distance between the obstacle and the predicted traveling course of the host vehicle. Thus, an alert may be preferentially made to the obstacle having a relatively low possibility of colliding with the host vehicle over the obstacle having a relatively high possibility of colliding with the host vehicle.

The present disclosure provides a driving assistance apparatus that can appropriately alert a driver to an obstacle having the highest possibility of colliding with a host vehicle by considering the distance between the obstacle and a predicted traveling course of the host vehicle.

An aspect of the present disclosure relates to an in-vehicle alert apparatus (hereinafter, referred to as the "apparatus according to the aspect of the present disclosure") including an object information acquiring device, a vehicle status information acquiring device, a display unit, and an electronic control unit. The object information acquiring device is configured to acquire object information related to a position of an object around a host vehicle with respect to the host vehicle and a relative speed of the object with respect to the host vehicle. The vehicle status information acquiring device is configured to acquire vehicle status information related to a traveling status of the host vehicle. An alert screen that guides driver's line of sight in a direction of where a processing target obstacle is present is displayed on the display unit. The electronic control unit is configured to estimate a predicted traveling course (RCR) of a center point in a vehicle width direction of the host vehicle based on the vehicle status information. The electronic control unit is configured to extract an object having a possibility of colliding with the host vehicle as an obstacle based on the object information and the predicted traveling course. The electronic control unit is configured to calculate an index value based on at least the object information of each extracted obstacle. The index value is changed in accordance with a degree of need for an alert operation that alerts the driver to each extracted obstacle. The electronic control unit is configured to select the processing target obstacle from the extracted obstacles by using the index value calculated for each extracted obstacle. The electronic control unit is configured to determine whether a specific condition is established. The specific condition is set to be established when the alert operation is needed in accordance with a result of comparison between the index value for the processing target obstacle and a predetermined threshold. The electronic control unit is configured to display the alert screen on the display unit when the electronic control unit determines that the specific condition is established.

The electronic control unit is configured to, when the electronic control unit extracts a plurality of the obstacles, execute, for each extracted obstacle, an operation of calculating a post-correction index value by calculating a distance between a specific point on the extracted obstacle and the predicted traveling course, setting the calculated distance as a correction lateral distance, and correcting the index value such that the "degree of need for the alert operation indicated by the index value" is increased as the correction lateral distance is decreased; and select the obstacle having the highest "degree of need for the alert operation indicated by the post-correction index value" as the processing target obstacle from the extracted obstacles.

The apparatus according to the aspect of the present disclosure corrects the index value to a value that indicates a higher degree of need for the alert operation as the distance between the specific point (for example, a center point between a left end point and a right end point of the obstacle as described below) on the obstacle and the predicted traveling course is smaller. The obstacle having the highest degree of need for the alert operation indicated by the post-correction index value is selected as the processing target obstacle. Thus, the obstacle having a short distance between the specific point and the predicted traveling course, that is, the obstacle having the highest possibility of colliding with the host vehicle and having a higher possibility of needing the alert operation, is selected as the processing target obstacle. Accordingly, the possibility that an alert toward the direction of the obstacle having a higher need for the alert operation is made can be further increased.

In the in-vehicle alert apparatus according to the aspect of the present disclosure, the electronic control unit may be configured to use a point between one end point and another end point of the obstacle in a direction orthogonal to the predicted traveling course as the specific point.

According to the aspect of the present disclosure, the distance between the center point of the obstacle and the predicted traveling course is set as the correction lateral distance, and the index value is corrected based on the correction lateral distance. Thus, even when the left end point and the right end point of the obstacle cannot be accurately specified, the post-correction index value is calculated with a certain level of accuracy. Accordingly, the possibility that an alert toward the direction of the obstacle having a higher need for the alert operation is made can be further increased.

In the in-vehicle alert apparatus according to the aspect of the present disclosure, the electronic control unit may be configured to use the closest point of the obstacle to the predicted traveling course in a direction orthogonal to the predicted traveling course as the specific point.

According to the aspect of the present disclosure, the distance between the "point estimated to have the highest possibility of colliding with the host vehicle" of the obstacle (that is, the closest point of the obstacle to the predicted traveling course in the direction orthogonal to the predicted traveling course) and the predicted traveling course is the correction lateral distance, and the index value is corrected based on the correction lateral distance. Thus, the post-correction index value has a value that more accurately indicates the degree of need for the alert operation. Accordingly, the possibility that an alert toward the direction of the obstacle having a higher need for the alert operation is made can be further increased.

In the in-vehicle alert apparatus according to the aspect of the present disclosure, the electronic control unit may be configured to set the calculated distance as the correction lateral distance when the obstacle is not positioned across the predicted traveling course, and set the correction lateral distance to zero when the obstacle is positioned across the predicted traveling course.

The obstacle positioned across the predicted traveling course has a higher possibility of colliding with the host vehicle than the obstacle not positioned across the predicted traveling course. Accordingly, according to the aspect, the correction lateral distance of the obstacle positioned across the predicted traveling course is set to zero. Thus, the index value of such an obstacle is corrected to the largest value such that the degree of need for an alert is increased. Accordingly, the possibility of selecting, as the processing target obstacle, the obstacle having the highest possibility of colliding with the host vehicle due to the position thereof across the predicted traveling course can be further increased.

In the in-vehicle alert apparatus according to the aspect of the present disclosure, the electronic control unit may be configured to calculate a margin time period as the index value. The margin time period is a time period in which the extracted obstacle comes into contact with or approaches the closest point to the host vehicle. The electronic control unit may be configured to determine whether the specific condition is established, by determining whether the margin time period as the index value of the processing target obstacle is less than or equal to a threshold time period as the threshold.

According to the aspect of the present disclosure, the margin time period that is a time period in which the obstacle comes into contact with or approaches the closest point to the host vehicle is used as the index value indicating whether or not to alert the driver. The post-correction index value that is used at the time of selecting the processing target obstacle has the value to which the margin time period is corrected. The margin time period is a parameter that accurately represents the degree of need for the alert operation for alerting the driver. Accordingly, the aspect enables accurately selecting the processing target obstacle and alerting the driver at an appropriate timing.

In the in-vehicle alert apparatus according to the aspect of the present disclosure, the electronic control unit may be configured to acquire, based on the correction lateral distance, an index value correction gain that is decreased as the correction lateral distance is decreased. The electronic control unit may be configured to set, as the post-correction index value, a post-correction margin time period that is calculated by multiplying the margin time period by the index value correction gain. The electronic control unit may be configured to select the obstacle having the smallest post-correction margin time period as the processing target obstacle from the extracted obstacles.

The aspect of the present disclosure enables, with a simple configuration, calculation of the post-correction margin time period that is decreased as the correction lateral distance is decreased.

In the in-vehicle alert apparatus according to the aspect of the present disclosure, the object information acquiring device may include a camera sensor and a radar sensor. The camera sensor includes a vehicle-mounted stereo camera and an image processing device processing an image captured by the vehicle-mounted stereo camera. The radar sensor is configured to radiate an electric wave in a millimeter wave band, receive a reflective wave reflected by the object when the object is present within a radiation range of a millimeter wave, and detect a distance between the host vehicle and the object, a direction of the object with respect to the host vehicle, and the relative speed of the object with respect to the host vehicle based on the reflective wave.

In the in-vehicle alert apparatus according to the aspect of the present disclosure, the vehicle status information acquiring device may include a vehicle speed sensor that is configured to detect a speed of a vehicle body of the host vehicle, an acceleration sensor that is configured to detect an acceleration of the host vehicle in a front-rear direction and a right-left direction in a horizontal direction, a yaw rate sensor that is configured to detect a yaw rate of the host vehicle, and a steering angle sensor that is configured to detect a steering angle of a steering wheel of the host vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an in-vehicle alert apparatus according to each embodiment of the present disclosure will be described by using the drawings.

First Embodiment

Figure 1:
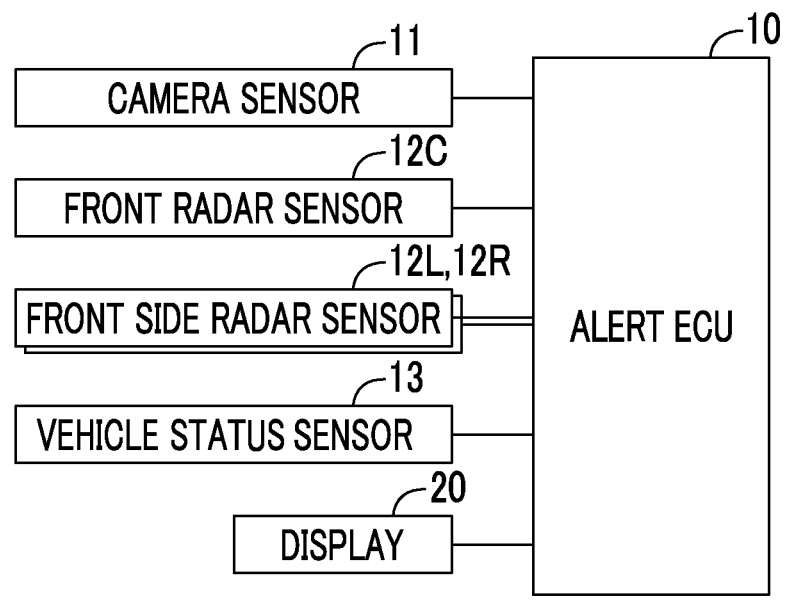
FIG. 1 is a schematic system configuration diagram of a driving assistance apparatus according to a first embodiment of the present disclosure.

FIG. 1 is a schematic system configuration diagram of an in-vehicle alert apparatus according to a first embodiment of the present disclosure (hereinafter, referred to as a "first apparatus"). The first apparatus is an apparatus that is mounted in a vehicle and alerts a driver (operator) of the vehicle to an obstacle having a possibility of colliding with the vehicle (that is, an apparatus that alerts to an obstacle). Hereinafter, the vehicle in which the in-vehicle alert apparatus according to the embodiments of the present disclosure is mounted will be referred to as a "host vehicle" when the vehicle needs to be distinguished from the other vehicles.

The first apparatus includes an alert ECU 10. ECU is the abbreviation for "Electronic Control Unit" and includes a microcomputer as a main part. The microcomputer includes a CPU and a storage such as a ROM and a RAM. The CPU realizes various functions by executing instructions (programs and routines) stored in the ROM.

The first apparatus includes a camera sensor 11, a front radar sensor 12C, front side radar sensors 12L, 12R, a vehicle status sensor 13, and a display 20. The alert ECU 10 is connected to the camera sensor 11, the front radar sensor 12C, the front side radar sensors 12L, 12R, the vehicle status sensor 13, and the display 20.

The camera sensor 11 includes a vehicle-mounted stereo camera that captures a view in front of the host vehicle, and an image processing device that processes the image captured by the vehicle-mounted stereo camera (any of the vehicle-mounted stereo camera and the image processing device is not illustrated).

The vehicle-mounted stereo camera transmits an image signal representing the captured image to the image processing device for each elapse of a predetermined time period.

The image processing device determines whether an object is present in the capturing region, based on the received image signal. When the image processing device determines that an object is present, the image processing device calculates the position of the object and identifies the type of object (a pedestrian, a bicycle, an automobile, and the like) by pattern matching. The position of the object is specified by the direction (azimuth) of the object with respect to the host vehicle and the distance between the object and the host vehicle. The image processing device extracts (specifies) a center point CP, an end point LEP on the left side (left end point), and a right end point REP of the object and acquires information as to the positions of the extracted points with respect to the host vehicle.

The camera sensor 11 outputs information indicating the position of the object (approximately the position of the center of the object; for example, the center between the left end point LEP and the right end point REP of the object) and information indicating the type of object to the alert ECU 10 for each elapse of a predetermined time period. The camera sensor 11 outputs the information as to the positions of the center point CP, the left end point LEP, and the right end point REP of the object with respect to the host vehicle to the alert ECU 10 for each elapse of a predetermined time period. The alert ECU 10 specifies a change in the position of the object based on the information indicating the position of the object received from the camera sensor 11. The alert ECU 10 finds a relative speed and a relative movement trajectory of the object with respect to the host vehicle based on the specified change in the position of the object.

Figure 2:
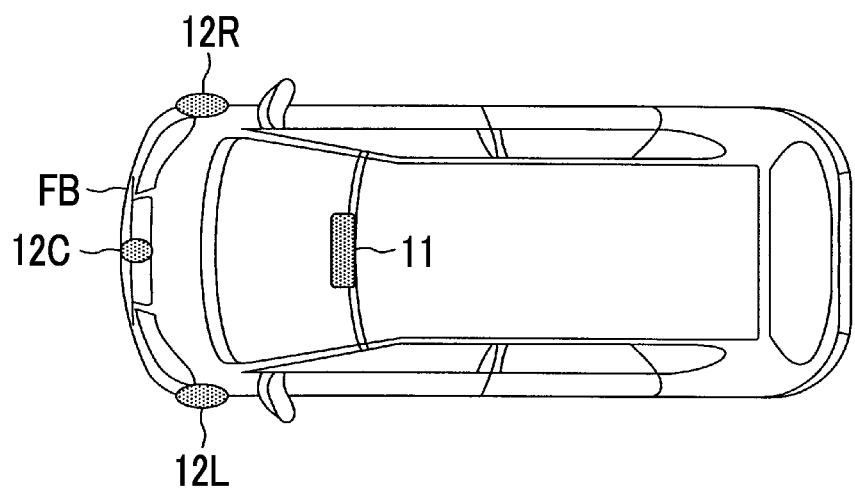
FIG. 2 is a diagram describing positions in which radar sensors and a camera sensor illustrated in FIG. 1 are attached.

As illustrated in FIG. 2, the front radar sensor 12C is disposed in the position of the center in the vehicle width direction of a front bumper FB of the host vehicle. The front side radar sensor 12R is disposed in a right corner portion of the front bumper FB. The front side radar sensor 12L is disposed in a left corner portion of the front bumper FB. Hereinafter, the front radar sensor 12C and the front side radar sensors 12L, 12R will be collectively referred to as a "radar sensor 12".

The radar sensor 12 radiates an electric wave in a millimeter wave band (hereinafter, referred to as a "millimeter wave"). When an object is present within the radiation range of the millimeter wave, the object reflects the millimeter wave radiated from the radar sensor 12. The radar sensor 12 receives the reflective wave and detects the distance between the host vehicle and the object (approximately, the position of the center of the object), the direction (azimuth) of the object with respect to the host vehicle, the relative speed of the object with respect to the host vehicle, and the like based on the reflective wave.

Figure 3:
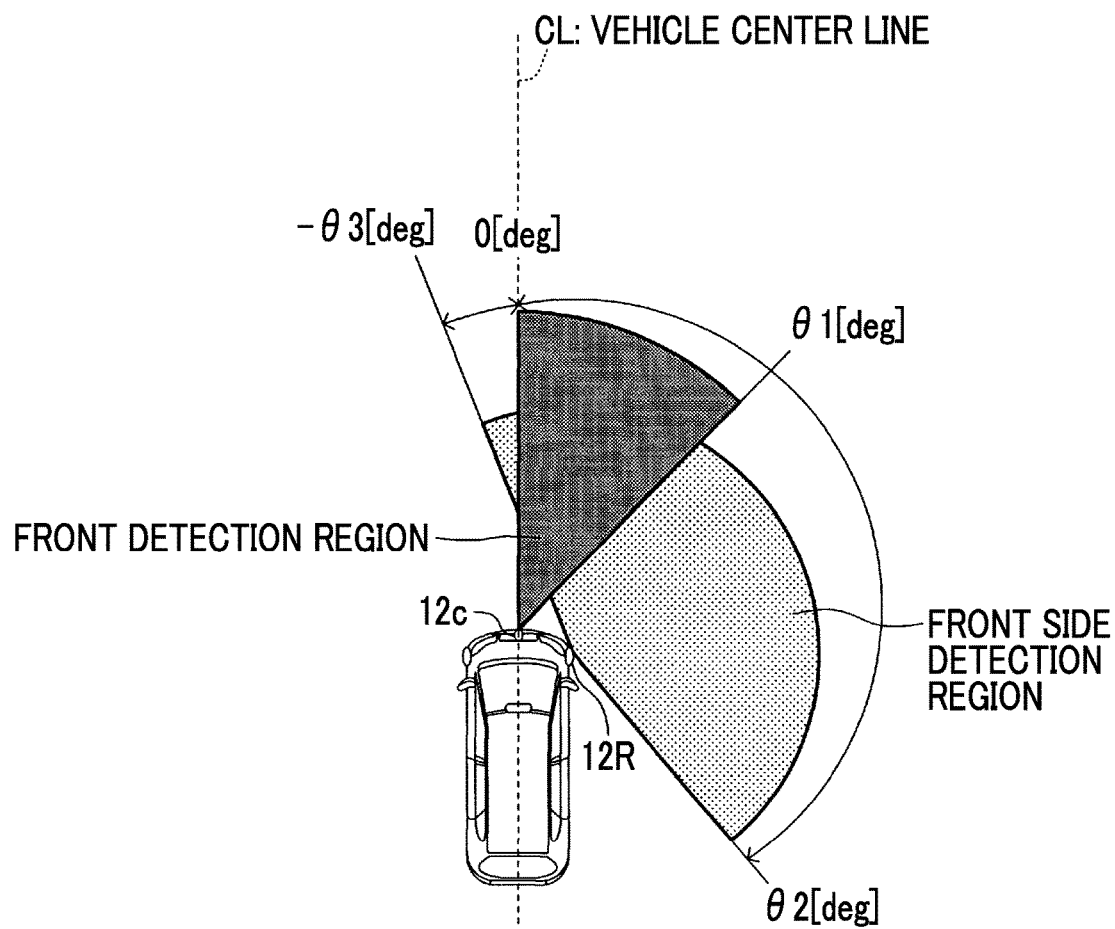
FIG. 3 is a diagram describing detection regions of the radar sensors illustrated in FIG. 1.

As illustrated in FIG. 3, the detection region of the front radar sensor 12C has a range of ±θ1 deg (0 deg<θ1<90 deg) in the right-left direction from a vehicle front-rear axis (the front side is 0 deg) (FIG. 3 does not illustrate the range in the left direction). Accordingly, the front radar sensor 12C mainly detects an object in front of the host vehicle. The detection region of the front side radar sensor 12R is θ2 deg (90 deg<θ2<180 deg) in the right direction and −θ3 deg (0 deg<θ3<90 deg) in the left direction from the vehicle front-rear axis. Accordingly, the front side radar sensor 12R mainly detects an object on the right side of the host vehicle. The detection region of the front side radar sensor 12L is, though not illustrated, a region that is bilaterally symmetric with the detection region of the front side radar sensor 12R about the vehicle front-rear axis. Accordingly, the front side radar sensor 12L mainly detects an object on the left side of the host vehicle. The detection distance of each of the radar sensors 12C, 12L, 12R is, for example, a few tens of meters. Each of the radar sensors 12C, 12L, 12R detects position information (the distance between the host vehicle and the object and the direction of the object with respect to the host vehicle) and the relative speed of the object (approximately, the position of the center of the object) with respect to the host vehicle for each elapse of a predetermined time period, and transmits the detected position information and relative speed to the alert ECU 10 for each elapse of a predetermined time period. Accordingly, the alert ECU 10 finds the relative speed and the relative movement trajectory of the object with respect to the host vehicle based on the information transmitted from the radar sensor 12.

Hereinafter, information of the object (includes information indicating the distance between the position of the approximate center of the object and the host vehicle, the direction (azimuth) of the position of the approximate center of the object with respect to the host vehicle, the relative speed of the object with respect to the host vehicle, and the type of object) detected by the camera sensor 11 and the radar sensor 12 will be referred to as object information. The information acquired by the radar sensor 12 is preferentially used as the distance and the relative speed between the object and the host vehicle. The information acquired by the camera sensor 11 is preferentially used as the azimuth of the object.

The vehicle status sensor 13 is a sensor that acquires vehicle status information related to the traveling status of the host vehicle which is used for estimating a predicted traveling course RCR (refer to FIG. 6) of the host vehicle. The vehicle status sensor 13 includes a vehicle speed sensor, an acceleration sensor, a yaw rate sensor, a steering angle sensor, and the like. The vehicle speed sensor detects the speed of the vehicle body (that is, the vehicle speed) of the host vehicle. The acceleration sensor detects the acceleration of the host vehicle in the front-rear direction and the right-left (lateral) direction in the horizontal direction. The yaw rate sensor detects the yaw rate of the host vehicle. The steering angle sensor detects the steering angle of a steering wheel. The vehicle status sensor 13 outputs the vehicle status information to the alert ECU 10 for each elapse of a predetermined time period.

The alert ECU 10 calculates the turning radius of the host vehicle based on the vehicle speed detected by the vehicle speed sensor and the yaw rate detected by the yaw rate sensor. The alert ECU 10 estimates a traveling course along which the center point in the vehicle width direction of the host vehicle (in actuality, the center point on an axle of right and left front wheels of the host vehicle) is moved as the predicted traveling course RCR based on the turning radius. When the yaw rate is generated, the predicted traveling course RCR has an arc shape. When the yaw rate is zero, the alert ECU 10 estimates a linear course extending in the direction of the acceleration detected by the acceleration sensor as the traveling course along which the host vehicle is moved (that is, the predicted traveling course RCR). The alert ECU 10 recognizes (determines) the predicted traveling course RCR as a path (that is, a line having a finite length) from the host vehicle to a location at a predetermined distance along the predicted traveling course RCR, regardless of whether the host vehicle is turning or traveling straight.

The display 20 is a head-up display (hereinafter, referred to as an "HUD"). The HUD receives display information from various ECUs and a navigation device in the host vehicle and projects the display information to a partial region (display region) of a windshield of the host vehicle. When an alert target described below is detected, the alert ECU 10 transmits a display instruction for an alert screen to the HUD. Accordingly, by using a part of the display region, the HUD displays an alert screen 80 (refer to FIG. 8) that guides driver's line of sight in the direction of the obstacle. The alert screen will be described in detail below.

The display 20 is not particularly limited to the HUD. That is, the display 20 may be a multi-information display (MID), a touch panel of the navigation device, and the like. The MID is a display panel in which meters such as a speedometer, a tachometer, a fuel gauge, a water temperature gauge, an odometer or a trip meter, and a warning lamp are collectively disposed on a dashboard.

Summary of Operation

The first apparatus estimates the predicted traveling course RCR of the host vehicle based on the vehicle status information input from the vehicle status sensor 13. The first apparatus extracts an object having a possibility of collision (obstacle) based on the predicted traveling course RCR and the object information input from the camera sensor 11 and the radar sensor 12. The first apparatus calculates an index value that is changed in accordance with the degree of need for an alert operation for the obstacle. The index value employs a margin time period (time-to-collision (TTC)) that is a time period in which the obstacle comes into contact with or approaches the closest point to the host vehicle.

The first apparatus calculates the distance between a specific point of each obstacle and the predicted traveling course RCR as a correction lateral distance, and corrects the index value such that the degree of need for the alert operation indicated by the index value of each obstacle is increased in accordance with the correction lateral distance. More specifically, the first apparatus corrects the margin time period TTC such that the margin time period TTC is decreased as the correction lateral distance is smaller. In actuality, the first apparatus calculates the distance between the center point CP of each obstacle and the predicted traveling course RCR as the correction lateral distance. The first apparatus sets the lateral position of the center point CP of each obstacle as a correction lateral position, and corrects the margin time period TTC such that the margin time period TTC is decreased as the correction lateral position is closer to the predicted traveling course RCR.

Next, the first apparatus selects the obstacle having the highest degree of need for the alert operation indicated by the post-correction index value (that is, the obstacle having the minimum post-correction margin time period TTC) as a processing target obstacle. When the result of comparison between the index value of the processing target obstacle and a predetermined threshold satisfies a specific condition (that is, when the margin time period of the processing target obstacle is less than or equal to a threshold (threshold time period) T1th), the first apparatus displays the alert screen 80 (refer to FIG. 8) that guides driver's line of sight in the direction of where the processing target obstacle is present.

Specific Operation

The CPU of the alert ECU 10 (hereinafter, the "CPU" will refer to the CPU of the alert ECU 10 unless otherwise specified) executes a routine illustrated by a flowchart in FIG. 4 for each elapse of a predetermined time period. The routine illustrated in FIG. 4 is a routine for displaying the alert screen 80 (refer to FIG. 8).

Figure 4:
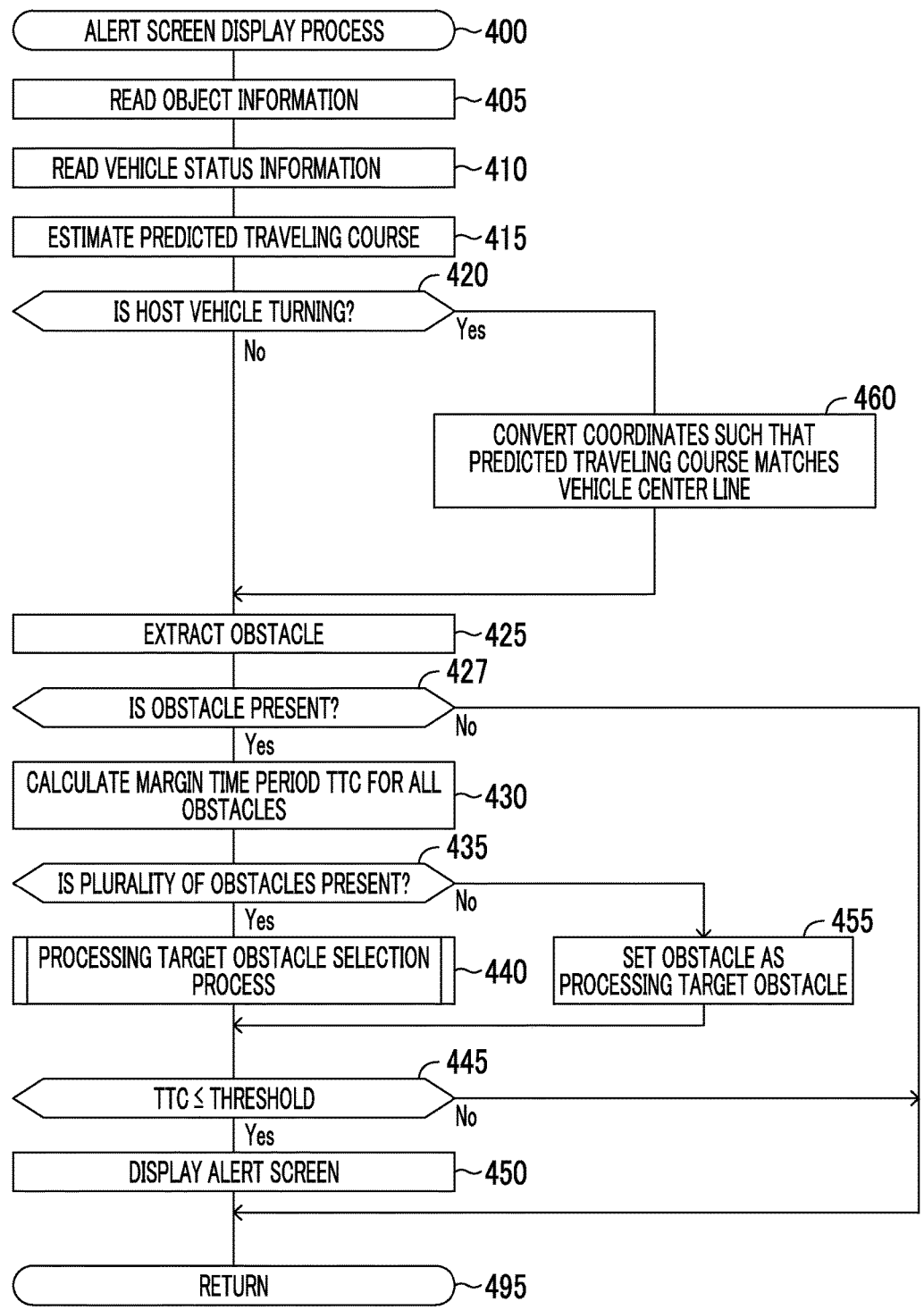
FIG. 4 is a flowchart illustrating a routine executed by a CPU of an alert ECU illustrated in FIG. 1.

Accordingly, when a predetermined timing arrives, the CPU starts processing from step 400 in FIG. 4. The CPU performs processes of step 405 to step 415 described below in order, and transitions to step 420.

Step 405: The CPU reads the object information acquired by the camera sensor 11 and the radar sensor 12.

Step 410: The CPU reads the vehicle status information acquired by the vehicle status sensor 13.

Step 415: The CPU estimates the predicted traveling course RCR as described above based on the vehicle status information read in step 410.

In step 420, the CPU determines whether the host vehicle is turning, based on the vehicle status information read in step 410. More specifically, when the yaw rate included in the vehicle status information is generated (that is, when the magnitude of the detected yaw rate is not "0"), the CPU determines that the host vehicle is turning. When the magnitude of the detected yaw rate is zero, the CPU determines that the host vehicle is not turning. The CPU may determine that the host vehicle is turning when the "difference between the wheel speed of the left front wheel and the wheel speed of the right front wheel" acquired from a wheel speed sensor is greater than or equal to a predetermined value.

When the host vehicle is not turning, the CPU makes a "No" determination in step 420 and transitions to step 425. The host vehicle is not turning when the host vehicle is traveling straight or when the host vehicle is stopped. The predicted traveling course RCR when the host vehicle is traveling straight matches a vehicle center line CL (refer to FIG. 3). The predicted traveling course RCR when the host vehicle is stopped also matches the vehicle center line CL (refer to FIG. 3). The vehicle center line CL is a line that extends forward along an axis extending in the front-rear direction from the position of the center in the vehicle width direction of a front end portion of a host vehicle SV. In other words, the vehicle center line CL is a line that extends in a direction orthogonal to the vehicle width direction from the position of the center in the vehicle width direction of the front end portion of the host vehicle SV.

In step 425, the CPU extracts an object having a possibility of colliding with the host vehicle (includes an object that approaches the closest point to the host vehicle) as an obstacle based on the object information read in step 405 and the predicted traveling course RCR estimated in step 415. More specifically, as described above, the CPU estimates a traveling course along which the center point on the axle of the right and left front wheels of the host vehicle (refer to a point PO in FIG. 6) is moved as the predicted traveling course RCR. The CPU estimates a left-side predicted traveling course and a right-side predicted traveling course based on the predicted traveling course RCR. A point PL that is positioned on the left side at a certain distance αL from a left end portion of the vehicle body of the host vehicle passes through the left-side predicted traveling course (refer to a course LEC in FIG. 6). A point PR that is positioned on the right side at a certain distance αR from a right end portion of the vehicle body of the host vehicle passes through the right-side predicted traveling course (refer to a course REC in FIG. 6). The left-side predicted traveling course LEC is a course that is acquired by translating the predicted traveling course RCR estimated in step 415 to the left side in the right-left direction of the host vehicle by a "value acquired by adding half of a vehicle width W (W/2) to the distance αL". The right-side predicted traveling course REC is a course that is acquired by translating the predicted traveling course RCR estimated in step 415 to the right side in the right-left direction of the host vehicle by a "value acquired by adding half of the vehicle width W (W/2) to the distance αR". The values of the distance αL and the distance αR are greater than or equal to "0". The distance αL and the distance αR may be the same or different from each other. The CPU specifies a region between the left-side predicted traveling course LEC and the right-side predicted traveling course REC as a predicted traveling course region ECA.

The CPU calculates (estimates) the movement trajectory of the object based on the previous position of the object. The CPU calculates the movement direction of the object with respect to the host vehicle based on the calculated movement trajectory of the object. Next, based on the predicted traveling course region ECA, the relative relationship (the relative position and the relative speed) between the host vehicle and the object, and the movement direction of the object with respect to the host vehicle, the CPU extracts an object that is already present within the predicted traveling course region ECA, and an object that is predicted to enter the predicted traveling course region ECA and intersect with a tip end region TA (refer to a line TA in FIG. 6) of the host vehicle, as an object having a possibility of colliding with the host vehicle (that is, an obstacle). The tip end region TA of the host vehicle is a region represented by a line that connects the point PL positioned at the certain distance αL on the left side from the left end of the front end portion of the vehicle body of the host vehicle and the point PR positioned at the certain distance αR on the right side from the right end of the front end portion of the vehicle body of the host vehicle.

Hereinafter, the process of step 425 will be more specifically described. When the CPU detects an object in front of the host vehicle, the CPU determines whether the object is within the predicted traveling course region ECA and whether the object may enter the predicted traveling course region ECA and intersect with the tip end region TA of the host vehicle. In such a case, the front of the host vehicle refers to the detection region of the front radar sensor 12C. Specifically, when the position of the object is within the predicted traveling course region ECA, the CPU determines that the object is within the predicted traveling course region ECA. When a line that extends in the movement direction of the object from the position of the object intersects with the predicted traveling course region ECA and the tip end region TA of the host vehicle, the CPU determines that the object "may enter the predicted traveling course region ECA and intersect with the tip end region TA of the host vehicle".

When the CPU determines that the object is "within the predicted traveling course region ECA or may enter the predicted traveling course region ECA and intersect with the tip end region TA of the host vehicle", and the camera sensor 11 determines that the object is a pedestrian, the CPU extracts the pedestrian as an obstacle having a possibility of colliding with the host vehicle.

When the CPU detects an object on a side in front of the host vehicle, the CPU determines whether the object may enter the predicted traveling course region ECA and intersect with the tip end region TA of the host vehicle. In such a case, the side in front of the host vehicle refers to the detection regions of the front side radar sensors 12L, 12R. Specifically, when a line that extends in the movement direction of the object from the position of the object detected on the side in front of the host vehicle intersects with the predicted traveling course region ECA and the tip end region TA of the host vehicle, the CPU determines that the object may enter the predicted traveling course region ECA and intersect with the tip end region TA of the host vehicle. When the CPU determines that the object may enter the predicted traveling course region ECA and intersect with the tip end region TA of the host vehicle, the CPU extracts the object as an obstacle having a possibility of colliding with the host vehicle, regardless of whether the object is a pedestrian, a bicycle, an automobile, or the like.

As described above, the CPU estimates the left-side predicted traveling course LEC as a "course through which the point PL positioned on the left side at the certain distance αL from the left end portion of the host vehicle passes", and estimates the right-side predicted traveling course REC as a "course through which the point PR positioned on the right side at the certain distance αR from the right end portion of the host vehicle passes". Thus, the CPU determines that even an object (a pedestrian, a bicycle, and the like) having a possibility of passing through the left-side vicinity or the right-side vicinity of the host vehicle is "within the predicted traveling course region ECA or may enter the predicted traveling course region ECA and intersect with the tip end region TA of the host vehicle". Accordingly, the CPU can extract even an object having a possibility of passing through the left side or the right side of the host vehicle as an obstacle.

As is understood from above, obstacles extracted by the process of step 425 include a pedestrian that is present in front of the host vehicle, a moving body that intersects with the right or left predicted traveling course of the host vehicle from a side of the host vehicle and then approaches to intersect with the tip end region TA of the host vehicle, and a moving body that has a possibility of passing through a side of the host vehicle.

Next, the CPU transitions to step 427 to determine whether an obstacle is extracted in step 425. When an obstacle is not extracted in step 425, the driver does not have to be alerted. In such a case, the CPU makes a "No" determination in step 427 and transitions to step 495 to temporarily finish the present routine. Consequently, the alert screen 80 (refer to FIG. 8) is not displayed.

When an obstacle is extracted in step 425, the CPU makes a "Yes" determination in step 427 and transitions to step 430.

Step 430: The CPU calculates the margin time period (time-to-collision) TTC for each of all obstacles extracted in the process of step 425. The margin time period (time-to-collision) TTC is any of a time period T1 and a time period T2 below.

A time period T1 to a time point at which the obstacle is predicted to collide with the host vehicle (a time period from the current time point to a predicted collision time point).

A time period T2 to a time point at which the obstacle that may pass on a side of the host vehicle approaches the closest point to the host vehicle (a time period from the current time point to a predicted closest point approaching time point).

The margin time period TTC is calculated by dividing the distance (relative distance) between the host vehicle and the obstacle by the speed (relative speed) of the obstacle with respect to the host vehicle. That is, the margin time period TTC is a time period in which the obstacle reaches the "tip end region TA of the host vehicle" when it is assumed that the obstacle and the host vehicle move while maintaining the current relative speed and relative movement direction thereof. When the obstacle is determined not to reach the tip end region TA of the host vehicle based on the movement direction of the obstacle, the margin time period TTC is set to infinity (in actuality, a value that is sufficiently greater than the threshold time period T1th).

The margin time period TTC represents a time period in which the driver can operate the host vehicle in order to avoid collision between the host vehicle and the obstacle. That is, the margin time period TTC is a parameter representing the degree of need for an alert and corresponds to the degree of need for an alert (hereinafter, referred to as an "alert need degree"). That is, as the margin time period TTC is smaller, the alert need degree is increased. As the margin time period TTC is larger, the alert need degree is decreased.

After the CPU calculates the margin time period TTC of the obstacle in step 430, the CPU transitions to step 435. In step 435, the CPU determines whether a plurality of obstacles is extracted in step 425.

When a plurality of obstacles is extracted in step 425, the CPU makes a "Yes" determination in step 435 and transitions to step 440 to select one processing target obstacle from the obstacles.

In step 440, the CPU executes a processing target obstacle selection process. In actuality, when the CPU transitions to step 440, the CPU executes a subroutine illustrated by a flowchart in FIG. 5. The subroutine is a routine for acquiring a post-correction margin time period TTCg and selecting the obstacle having the minimum post-correction margin time period TTCg as the processing target obstacle. The subroutine corrects the margin time period TTC such that the margin time period TTC is decreased as the lateral distance between the predicted traveling course RCR and the center point CP of the obstacle is smaller.

Figure 5:
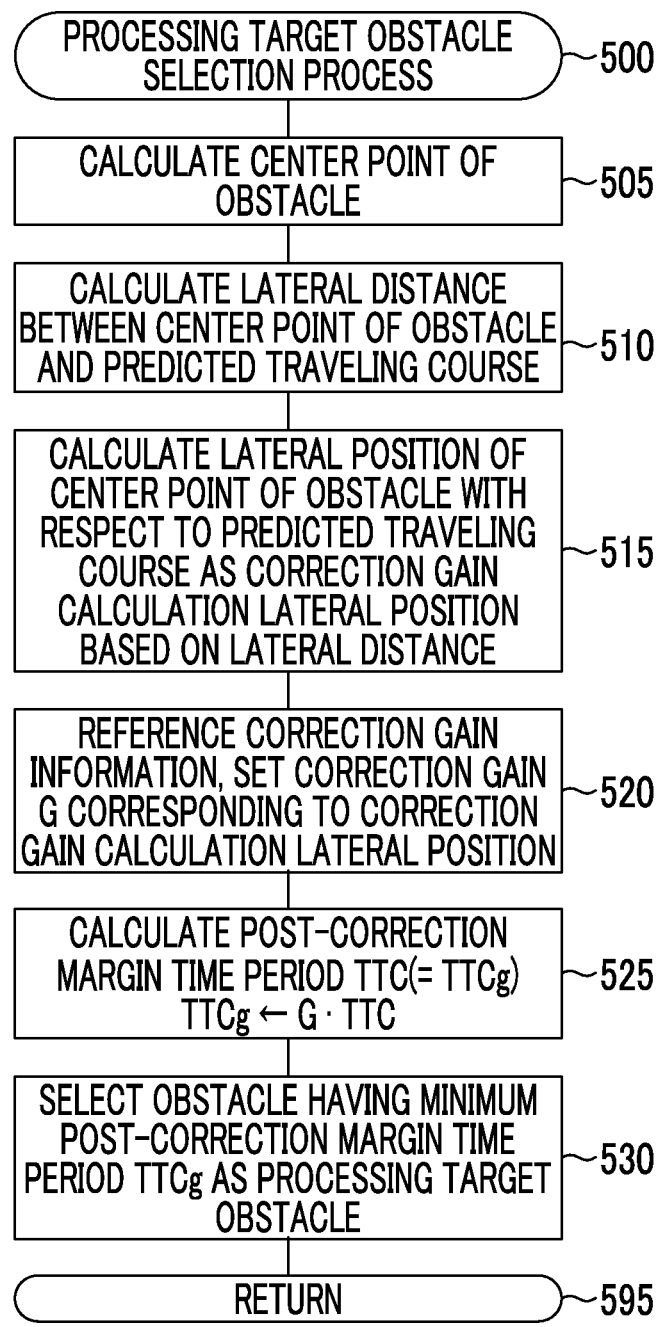
FIG. 5 is a flowchart illustrating a routine executed by the CPU of the alert ECU in a processing target obstacle selection process of the routine illustrated in FIG. 4.

That is, when the CPU transitions to step 440, the CPU starts processing from step 500 in FIG. 5. The CPU performs processes of step 505 to step 530 described below in order, and transitions to step 445 in FIG. 4 through step 595.

Figure 6:
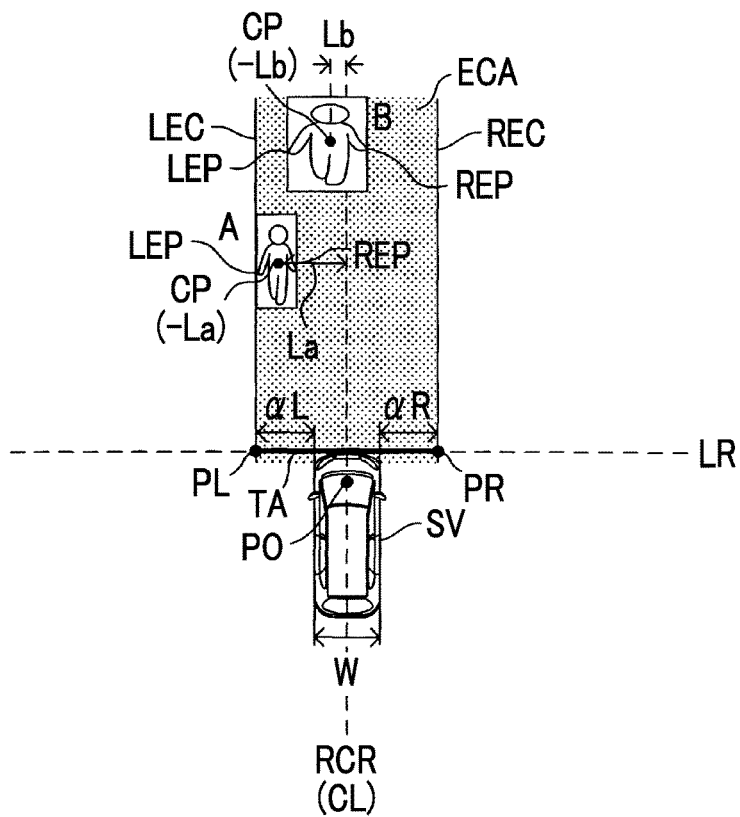
FIG. 6 is a diagram describing a positional relationship between a plurality of pedestrians (obstacles) and a host vehicle when one pedestrian is selected as a processing target obstacle from the pedestrians.

Step 505: The CPU extracts the center point CP (refer to FIG. 6) of each obstacle based on the object information read in step 405, and transitions to step 510. The center point CP of the obstacle will be described by using FIG. 6. FIG. 6 is an illustration of when the host vehicle is traveling straight. The predicted traveling course RCR matches the vehicle center line CL. The center point CP of each obstacle (a pedestrian A and a pedestrian B) is the position of the center between the left end point LEP and the right end point REP of each obstacle in a direction (vehicle width direction) LR that is orthogonal to the predicted traveling course RCR (vehicle center line CL). Thus, the CPU extracts the left end point LEP and the right end point REP in the right-left direction line LR of each obstacle, and extracts the position of the center between the extracted left end point LEP and right end point REP in the direction LR orthogonal to the predicted traveling course RCR as the center point CP of each obstacle.

Step 510: The CPU calculates a lateral distance DC between the center point CP of each obstacle extracted in step 505 and the predicted traveling course RCR. Since the radar sensor 12 measures the distance between the position of the center of the object and the host vehicle and the azimuth of the position of the center of the object with respect to the host vehicle, the CPU may calculate the lateral distance DC between the center point CP of each obstacle and the predicted traveling course RCR based on the object information received from the radar sensor 12. In such a case, the process of step 505 may be omitted.

Step 515: The CPU calculates the position (the lateral position or the lateral coordinate) of the center point CP of each obstacle with respect to the predicted traveling course RCR as a correction gain calculation lateral position based on the lateral distance DC calculated in step 510. Specifically, the lateral position of the center point CP positioned in the region on the left side of the predicted traveling course RCR has a negative value. The lateral position of the center point CP positioned in the region on the right side of the predicted traveling course RCR has a positive value. That is, the lateral position of the center point CP positioned in the region on the left side of the predicted traveling course RCR is "−DC". The lateral position of the center point CP positioned in the region on the right side of the predicted traveling course RCR is "DC". When the center point CP is positioned on the predicted traveling course RCR, the lateral position of the center point CP is "0".

Step 520: The CPU references correction gain information 70 illustrated in FIG. 7 and acquires a correction gain G corresponding to the correction gain calculation lateral position calculated in step 515 for each obstacle extracted in step 425 in FIG. 4.

Figure 7:
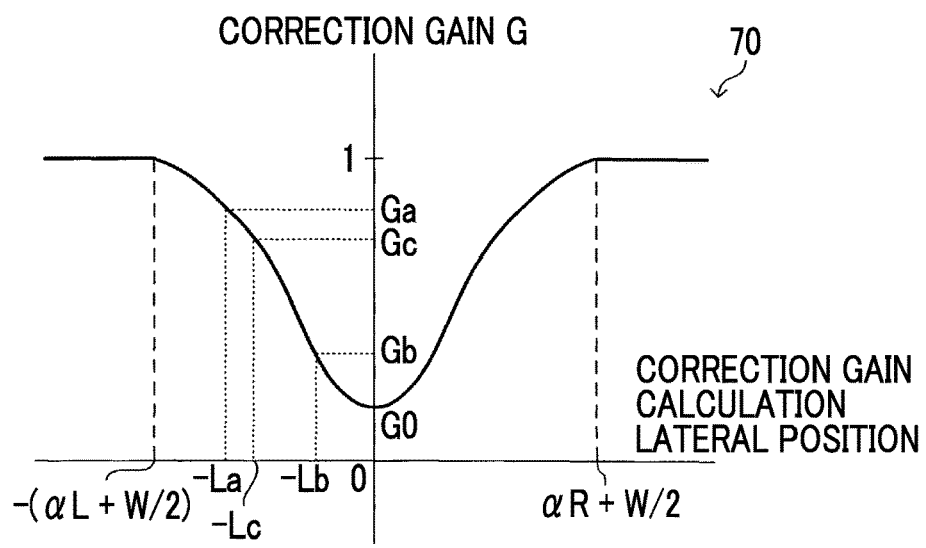
FIG. 7 is a diagram describing correction gain information.

Details of the correction gain information 70 will be described by using FIG. 7. The correction gain information 70 is stored in the form of a lookup table (map) in the ROM of the alert ECU 10. The correction gain information 70 defines the relationship between the correction gain calculation lateral position and the correction gain G The correction gain G has a value greater than "0" and less than or equal to "1" in the correction gain information 70. The correction gain G is set to a value that corrects the margin time period TTC to a smaller value as the correction gain calculation lateral position approaches "0". As described below, the margin time period TTC is corrected by multiplying the margin time period TTC by the correction gain and the post-correction margin time period TTCg (=G·TTC) is calculated.

Accordingly, in the correction gain information 70, the correction gain G is set to be decreased as the lateral distance indicated by the correction gain calculation lateral position is smaller. That is, as the center point CP of the obstacle approaches the predicted traveling course RCR, the margin time period TTC of the obstacle is corrected to a smaller value, and the corrected margin time period TTC is acquired as the post-correction margin time period TTCg. As described below, the CPU selects the obstacle having the minimum post-correction margin time period TTCg as the processing target obstacle. Thus, as the lateral distance of an obstacle is smaller, the possibility of selecting the obstacle as the processing target obstacle is increased.

According to the correction gain information 70, when the correction gain calculation lateral position is greater than or equal to the "value acquired by adding half of the vehicle width W (W/2) to the distance αR", and when a threshold calculation lateral position is less than or equal to a "value acquired by inverting the sign of the value acquired by adding half of the vehicle width W (W/2) to the distance αL", the correction gain G is set to "1". Accordingly, when the center point CP of the obstacle is present on the right side of the predicted traveling course RCR, and the lateral distance between the center point CP of the obstacle and the predicted traveling course RCR is greater than or equal to the "value acquired by adding half of the vehicle width W (W/2) to the distance αR", the correction gain G is set to "1". Thus, the margin time period TTC of the obstacle is substantially not corrected (that is, the post-correction margin time period TTCg is equal to the margin time period TTC). Similarly, when the center point CP of the obstacle is present on the left side of the predicted traveling course RCR, and the lateral distance between the center point CP of the obstacle and the predicted traveling course RCR is greater than or equal to the "value acquired by adding half of the vehicle width W (W/2) to the distance αL", the correction gain G is set to "1". Thus, the margin time period TTC of the obstacle is substantially not corrected (that is, the post-correction margin time period TTCg is equal to the margin time period TTC).

Step 525: The CPU calculates the post-correction margin time period TTCg by correcting the margin time period TTC of each obstacle using the correction gain G set for each obstacle in step 520. Specifically, the CPU calculates the post-correction margin time period TTCg by multiplying the margin time period TTC of each obstacle by the correction gain G set for each obstacle in step 520.

Step 530: The CPU selects the obstacle having the minimum post-correction margin time period TTCg calculated in step 525 as the processing target obstacle. Then, the CPU transitions to step 595 to temporarily finish the present routine, and transitions to step 445 illustrated in FIG. 4.

When the CPU transitions to step 445 after selecting the processing target obstacle in step 440 in FIG. 4 as described above, the CPU determines whether the margin time period TTC of the processing target obstacle is less than or equal to the predetermined threshold (threshold time period) T1th.

When the margin time period TTC of the processing target obstacle is less than or equal to the threshold T1th, the CPU makes a "Yes" determination in step 445 and transitions to step 450. In step 450, the CPU displays, on the display 20, the first alert screen 80 (refer to FIG. 8) that guides driver's line of sight in the direction of where the processing target obstacle is present. Then, the CPU transitions to step 495 to temporarily finish the present routine.

Details of the alert screen 80 will be described by using FIG. 8. The display region of the display 20 is provided in a region on the windshield of the host vehicle in front of a driver seat. The center line of the display region is illustrated by a dot-dashed line in FIG. 8. While the center line is illustrated for convenience of description, the center line is not displayed in the actual display region. The center line of the display region corresponds to the vehicle center line CL. A region on the left side of the center line of the display region corresponds to a left region around the front of the host vehicle. A region on the right side of the center line of the display region corresponds to a right region around the front of the host vehicle.

A sight line guiding icon 81 that guides driver's line of sight in the direction of the processing target obstacle is displayed in the alert screen 80. In the present specification, the sight line guiding icon may be referred to as a display element or a sight line guiding mark.

The sight line guiding icon 81 has a shape in which three arcs are linearly arranged. The sight line guiding icon 81 is displayed in a radial shape in a range of ±90 deg in the right-left direction from a predetermined position P0 on the center line of the display region as the center of the range. An arc that is further from the predetermined position P0 among the three arcs has a shorter length. The three arcs are lit in order from the closest arc to the position P0. The sight line guiding icon 81 can be displayed in units of angles (12 deg) acquired by equally dividing, into 15 parts, an angular range (180 deg) from a line that is a part of a horizontal line orthogonal to the center line and extends to the right side from the position P0, to a line that is a part of the horizontal line and extends to the left side from the position P0. While a position (axis line) in which the sight line guiding icon 81 can be displayed is illustrated by a dotted line in FIG. 8, the dotted line is not displayed in the actual display region.

Figure 8:
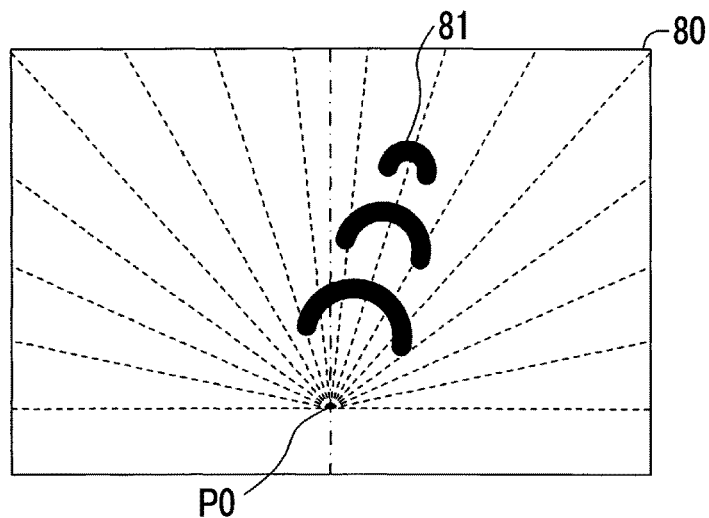
FIG. 8 is a diagram describing an alert screen.

In the example illustrated in FIG. 8, the sight line guiding icon 81 indicates the direction at 18 deg to the right side from the center line of the display region and indicates that the processing target obstacle is present in the direction. By guiding driver's line of sight in the direction indicated by the sight line guiding icon 81, the driver is alerted to the processing target obstacle. When the CPU transitions to step 450 in FIG. 4, the CPU determines the direction indicated by the sight line guiding icon 81 based on the direction (azimuth) of the processing target obstacle, and transmits a display instruction to the display (HUD) 20 to display the sight line guiding icon 81 in the direction.

When the margin time period TTC of the processing target obstacle is greater than the threshold T1th, the CPU makes a "No" determination in step 445 and transitions to step 495 to temporarily finish the present routine. Consequently, when the margin time period TTC of the processing target obstacle is greater than the threshold T1th, the alert screen 80 is not displayed.

When a plurality of obstacles is not extracted in step 425 (that is, when one obstacle is extracted in step 425), the CPU makes a "No" determination in step 435 and transitions to step 455. In such a case, one obstacle is present since the CPU determines that at least one obstacle is present in step 427. In step 455, the CPU sets the one obstacle extracted in step 425 as the processing target obstacle and transitions to step 445.

When the host vehicle is turning, and the CPU transitions to step 420, the CPU makes a "Yes" determination in step 420 and transitions to step 460. In step 460, the CPU converts the coordinates of each object such that the predicted traveling course RCR matches the vehicle center line CL, while the distance between the predicted traveling course RCR and the position of the center of the object and the distance between the object and the host vehicle SV when the host vehicle SV is assumed to travel along the predicted traveling course RCR are maintained. The CPU transitions to step 425.

Figure 9:
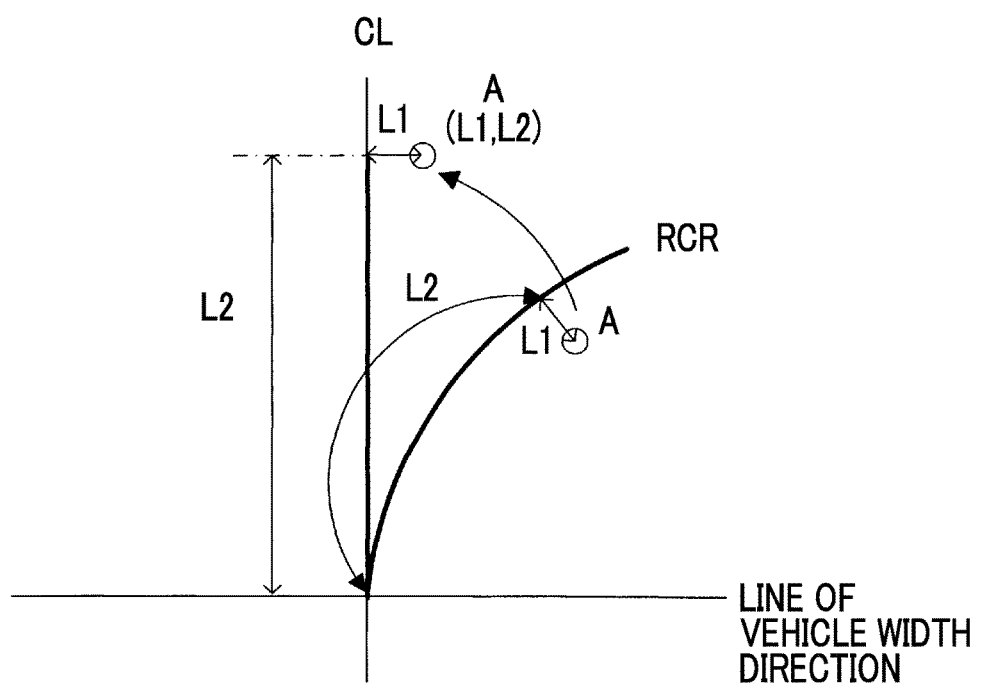
FIG. 9 is a diagram describing coordinate conversion in order to match a predicted traveling course and a vehicle center line when a vehicle is turning.

Details of step 460 will be described by using FIG. 9. In FIG. 9, the distance between the predicted traveling course RCR and the position of the center of an object A is "L1". The distance between the object A and the host vehicle SV when the host vehicle SV is assumed to travel along the predicted traveling course RCR is "L2". The "distance between the object A and the host vehicle SV when the host vehicle SV is assumed to travel along the predicted traveling course RCR" is, in other words, the "distance (path distance) along the predicted traveling course RCR from the host vehicle SV to the closest point to the object A in the predicted traveling course RCR".

The coordinates of the object A are converted such that the predicted traveling course RCR matches the vehicle center line CL, while the distance "L1" between the predicted traveling course RCR and the object A and the distance "L2" between the object A and the host vehicle SV when the host vehicle SV is assumed to travel along the predicted traveling course RCR are maintained. Thus, the distance between the vehicle center line CL and the object A after coordinate conversion is "L1", and the distance between the host vehicle SV and the object A after coordinate conversion is "L2". Accordingly, the coordinates of the object A after coordinate conversion are (L1, L2) in a coordinate system having an x axis denoting the vehicle width direction and a y axis denoting the direction of the vehicle center line CL.

Then, the CPU executes the processes of step 425 and below by using the coordinates of the object after coordinate conversion.

A process of extracting the obstacle from objects having converted coordinates (step 425 in FIG. 4) will be described. In step 425, the CPU converts the previous coordinates of the position of the object of which the coordinates are converted in step 460. More specifically, in the same manner as step 460, the CPU converts the previous coordinates of the position of the object such that the predicted traveling course RCR matches the vehicle center line CL, while the distance between the currently estimated predicted traveling course RCR and the previous position of the center of the object and the previous distance between the object and the host vehicle SV when the host vehicle SV is assumed to travel along the currently estimated predicted traveling course RCR are maintained.

The CPU calculates the movement trajectory of the object based on the coordinates of the object after coordinate conversion, and calculates the movement direction of the object based on the calculated movement trajectory of the object. Accordingly, the movement direction of the object in the coordinate system after coordinate conversion is calculated. The CPU extracts an object that is already present in the predicted traveling course region ECA, and an object that is predicted to enter the predicted traveling course region ECA and intersect with the tip end region TA of the host vehicle, as the obstacle based on the predicted traveling course region ECA that depends on the predicted traveling course RCR matching the vehicle center line CL, the relative relationship (the relative position after coordinate conversion and the relative speed after coordinate conversion) between the host vehicle and the object after coordinate conversion, and the movement direction of the object with respect to the host vehicle after coordinate conversion.

In step 430, the CPU calculates the margin time period TTC by dividing the distance between the host vehicle and the obstacle specified from the position of the obstacle with respect to the host vehicle after coordinate conversion by the relative speed of the obstacle with respect to the host vehicle that depends on the movement direction calculated based on the previous movement trajectory of the obstacle after coordinate conversion.

Details of the processing target obstacle selection process using the coordinates of the object after coordinate conversion will be described. In step 505, the CPU extracts the center point CP of the obstacle after coordinate conversion. The center point CP is a point in the obstacle after coordinate conversion in the middle position between the left end point LEP and the right end point REP in a direction orthogonal to the vehicle center line CL after coordinate conversion (that is, the vehicle width direction). The center point CP of the obstacle after coordinate conversion is the center point CP of the obstacle before coordinate conversion in a direction orthogonal to the predicted traveling course RCR of the host vehicle. The direction that is orthogonal to the predicted traveling course RCR is a direction that is orthogonal to the tangent to the predicted traveling course RCR at the closest point on the predicted traveling course RCR to the center point of the obstacle.

Thus, the center point of the obstacle after coordinate conversion extracted in step 505 is said to be the center point of the obstacle before coordinate conversion in the direction orthogonal to the predicted traveling course RCR.

In step 510, the CPU calculates the lateral distance between the vehicle center line CL and the center point CP of the obstacle after coordinate conversion extracted in step 505. The lateral distance is the lateral distance between the predicted traveling course RCR and the center point CP of the obstacle before coordinate conversion. In step 515, the CPU calculates the lateral position, with respect to the vehicle center line CL, of the center point CP of the obstacle after coordinate conversion extracted in step 505. The lateral position is the lateral position of the center point CP of the obstacle before coordinate conversion with respect to the predicted traveling course RCR before coordinate conversion.

The processes of step 520 and below are the same as when the host vehicle SV is not turning, and thus, will not be described.

As described heretofore, when the host vehicle SV is turning, the CPU performs the coordinate conversion and then calculates the correction gain calculation lateral position. Accordingly, since the correction gain calculation lateral position is calculated in accordance with the predicted traveling course RCR along which the host vehicle SV may actually travel, the correction gain is more accurately set when the host vehicle SV is turning. Accordingly, the possibility of selecting the obstacle having a small lateral distance with the predicted traveling course RCR and having a high possibility of colliding with the host vehicle SV as the processing target obstacle is further increased.

Next, the "process of selecting the processing target obstacle from a plurality of pedestrians (obstacles)" executed by the first apparatus will be described by using one example illustrated in FIG. 6. The example illustrated in FIG. 6 assumes that all of the following conditions are established.

- The host vehicle SV is not turning and is traveling straight.
- Objects other than "the pedestrian A and the pedestrian B" are not detected.
- Both of the position of the center (CP) of the pedestrian A and the position of the center (CP) of the pedestrian B are positioned within the predicted traveling course region ECA and are on the left side of the predicted traveling course RCR.
- The margin time period TTC of the pedestrian A (a time period in which the pedestrian A approaches the closest point to the host vehicle SV=TTC(A)) is smaller than the margin time period TTC of the pedestrian B (a time period in which the pedestrian B is predicted to collide with the host vehicle SV=TTC(B)) (that is, TTC(A) <TTC(B)).
- Both of the position of the center of the pedestrian A and the position of the center of the pedestrian B are present within the predicted traveling course region ECA. Thus, both of "the pedestrian A and the pedestrian B" are extracted as the obstacle in step 425. Accordingly, since a plurality of obstacles (that is, the pedestrian A and the pedestrian B) is extracted, a "Yes" determination is made in step 435, and the processing target obstacle selection process is executed in step 440 (that is, the subroutine in FIG. 5).

Accordingly, in step 505, the center point CP of the pedestrian A and the center point CP of the pedestrian B are extracted. In step 510, a lateral distance "La" between the center point CP of the pedestrian A and the predicted traveling course RCR and a lateral distance "Lb" between the center point CP of the pedestrian B and the predicted traveling course RCR are calculated. Since the host vehicle is traveling straight, the predicted traveling course RCR matches the vehicle center line CL. Both of the center point CP of the pedestrian A and the center point CP of the pedestrian B are positioned on the left side of the predicted traveling course RCR. Thus, in step 515, the lateral position of the center point CP of the pedestrian A is calculated as "-La", and the lateral position of the center point CP of the pedestrian B is calculated as "-Lb". That is, the correction gain calculation lateral position of the pedestrian A is "-La", and the correction gain calculation lateral position of the pedestrian B is "-Lb".

In step 520, based on the correction gain information 70, the correction gain G (=Ga) that corresponds to the correction gain calculation lateral position "-La" of the pedestrian A is set, and the correction gain G (=Gb) that corresponds to the correction gain calculation lateral position "-Lb" of the pedestrian B is set. As illustrated in FIG. 6, the lateral distance "Lb" between the pedestrian B and the predicted traveling course RCR is smaller than the lateral distance "La" between the pedestrian A and the predicted traveling course RCR. Accordingly, as illustrated in FIG. 7, the correction gain Gb set for the pedestrian B is smaller than the correction gain Ga set for the pedestrian A.

In step 525, the post-correction margin time period TTCg (A) of the pedestrian A and the post-correction margin time period TTCg(B) of the pedestrian B are calculated as follows. The margin time period TTC of the pedestrian A is denoted by TTC(A), and the margin time period TTC of the pedestrian B is denoted by TTC(B) below.

$$TTCg(A)=Ga \cdot TTC(A)$$

$$TTCg(B)=Gb-TTC(B)$$

In the assumption of the present example, TTC(A)<TTC (B) is established. However, since the correction gain Gb of the pedestrian B is smaller than the correction gain Ga of the pedestrian A, the post-correction margin time period TTCg (B) of the pedestrian B may be smaller than the post-correction margin time period TTCg(A) of the pedestrian A. That is, the following inequality may be established.

$$TTCg(B)<TTCg(A)$$

Thus, when the relationship of the inequality (TTCg(B) <TTCg(A)) is established, the pedestrian B is selected as the processing target obstacle in step 530 in which the obstacle having the minimum post-correction margin time period TTCg is selected as the processing target obstacle. That is, even when the margin time period TTC(A) of the pedestrian A is smaller than the margin time period TTC(B) of the pedestrian B, the pedestrian B may be selected as the processing target obstacle by the processing target obstacle selection process.

The pedestrian B is closer to the predicted traveling course RCR than the pedestrian A. The possibility of collision between the pedestrian B and the host vehicle SV is higher than the possibility of collision between the pedestrian A and the host vehicle SV. In other words, the driver should perform an operation of avoiding colliding with or approaching the pedestrian B preferentially over an operation of avoiding colliding with or approaching the pedestrian A.

However, since the margin time period TTC(A) of the pedestrian A is smaller than the margin time period TTC(B) of the pedestrian B, the pedestrian A is selected as the processing target obstacle when the obstacle having the minimum margin time period TTC is selected as the processing target obstacle. When the margin time period TTC (A) of the pedestrian A is less than or equal to the threshold T1th, an alert to the pedestrian A is preferentially made.

The first apparatus selects the obstacle having the minimum "value of the margin time period TTC that is corrected such that the margin time period TTC of the obstacle is apparently decreased as the lateral distance between the obstacle and the predicted traveling course RCR is smaller (that is, the post-correction margin time period TTCg)" as the processing target obstacle by the processing target obstacle selection process. Thus, even though the margin time period TTC of the pedestrian B is greater than the pedestrian A, the pedestrian B that has a higher possibility of colliding with the host vehicle SV than the pedestrian A is likely to be selected as the processing target obstacle. Consequently, even in such a situation, driver's line of sight can be securely guided in the direction of the obstacle having the highest possibility of colliding with the host vehicle SV.

Second Embodiment

Next, an in-vehicle alert apparatus according to a second embodiment of the present disclosure (hereinafter, referred to as a "second apparatus") will be described. The second apparatus is different from the first apparatus in that the lateral position of one of the left end point LEP and the right end point REP of the obstacle having a smaller lateral distance is used as the correction gain calculation lateral position in the processing target obstacle selection process. Hereinafter, the difference will be mainly described.

Figure 10:
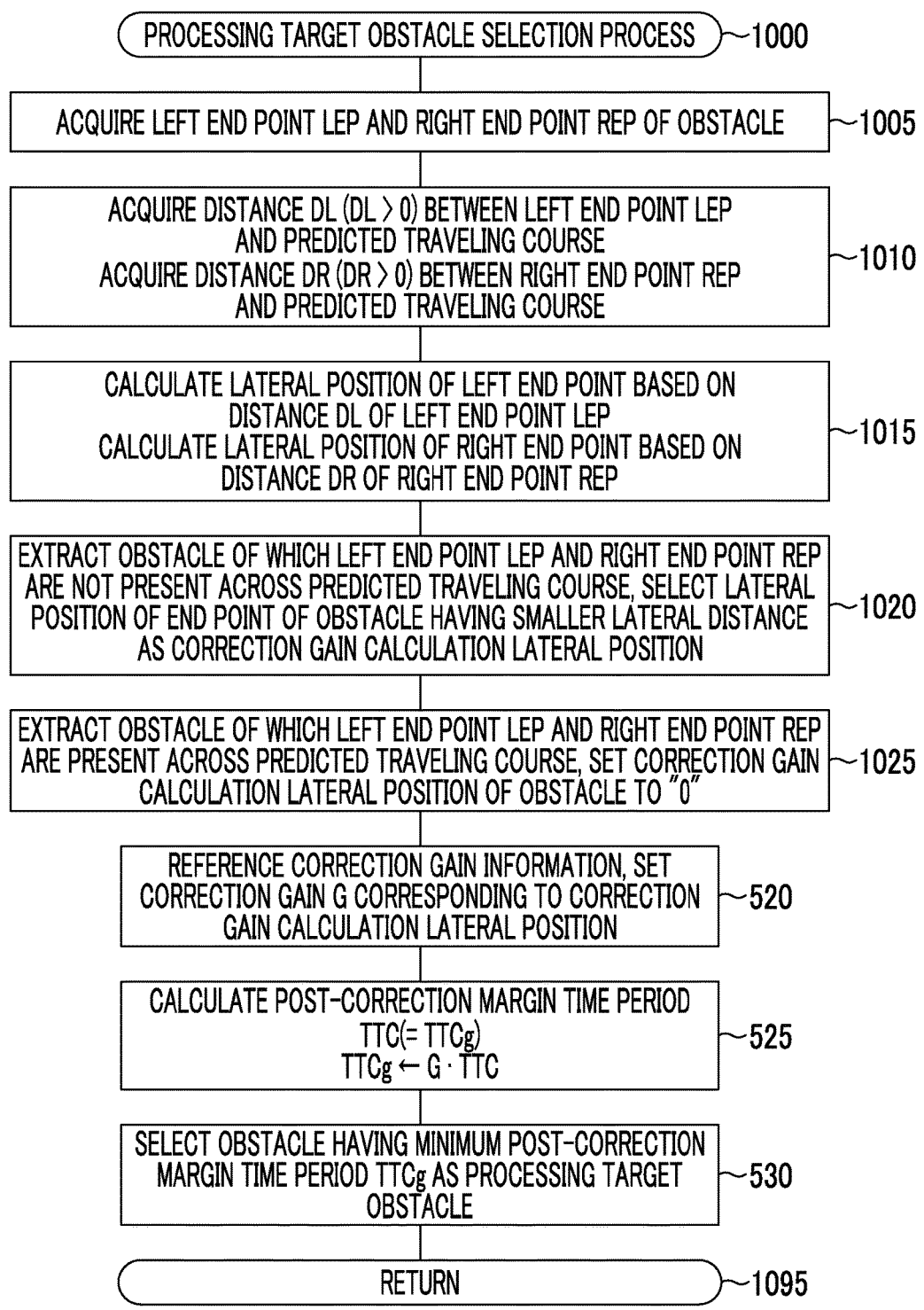
FIG. 10 is a flowchart illustrating a routine executed by a CPU of an in-vehicle alert apparatus of a second embodiment of the present disclosure.

The CPU of the second apparatus executes the routine illustrated in FIG. 4 for each elapse of a predetermined time period, in the same manner as the CPU of the first apparatus. However, when the CPU of the second apparatus transitions to step 440 in FIG. 4, the CPU of the second apparatus executes a subroutine illustrated by a flowchart in FIG. 10 instead of FIG. 5. That is, the routine in FIG. 10 is a routine for selecting the processing target obstacle. Among steps illustrated in FIG. 10, steps in which the same processes as the steps illustrated in FIG. 5 are performed will be designated with the same reference signs as the steps in FIG. 5. The steps will not be described in detail.

That is, when the CPU transitions to step 440, the CPU starts processing from step 1000 in FIG. 10. The CPU performs processes of step 1005 to step 1025 described below in order, and transitions to step 520.

Step 1005: The CPU extracts the left end point LEP and the right end point REP of the obstacle based on information transmitted from the camera sensor 11. Details of the left end point LEP and the right end point REP will be described by using FIG. 11.

Figure 11:
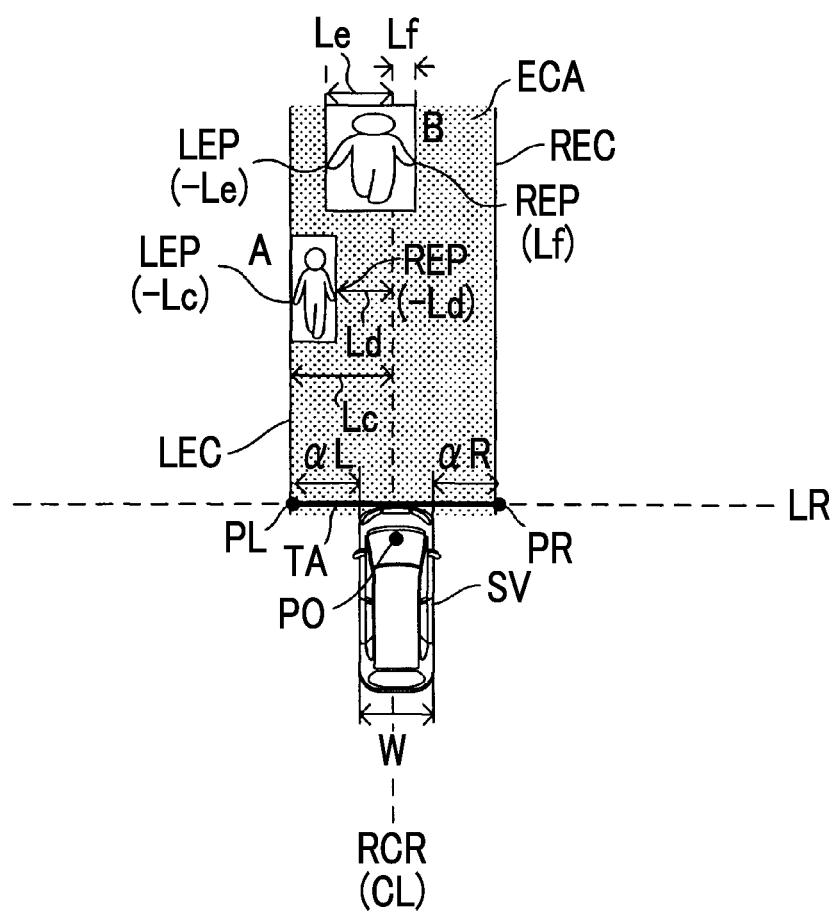
FIG. 11 is a diagram describing a positional relationship between a plurality of pedestrians (obstacles) and a host vehicle when one pedestrian is selected as a processing target obstacle from the pedestrians.

In the example illustrated in FIG. 11, the CPU extracts, as the left end point LEP, a point that is positioned on the leftmost side in the direction LR orthogonal to the predicted traveling course RCR in the image region of the pedestrian A. The CPU extracts (specifies), as the right end point REP, a position that is positioned on the rightmost side in the direction LR orthogonal to the predicted traveling course RCR in the image region of the pedestrian A. Since the predicted traveling course RCR matches the vehicle center line CL when the host vehicle SV is traveling straight, the direction LR that is orthogonal to the predicted traveling course RCR is the vehicle width direction. The left end point LEP and the right end point REP of the pedestrian B are extracted (specified) in the same manner.

Step 1010: The CPU acquires a distance (left end point distance) DL between the left end point LEP and the predicted traveling course RCR, and acquires a distance (right end point distance) DR between the right end point REP and the predicted traveling course RCR. The values of both of the left end point distance DL and the right end point distance DR are greater than or equal to "0". In such a case, the CPU calculates the left end point distance DL and the right end point distance DR from information as to the positions of the left end point LEP and the right end point REP received from the camera sensor 11.

Step 1015: The CPU calculates the position (the lateral position or the lateral coordinate) of the left end point LEP with respect to the predicted traveling course RCR based on the left end point distance DL calculated in step 1010. The CPU calculates the position (the lateral position or the lateral coordinate) of the right end point REP with respect to the predicted traveling course RCR based on the right end point distance DR calculated in step 1010. A method of calculating the lateral position is the same as the method of calculation in step 515.

Step 1020: The CPU selects the obstacle of which the left end point LEP and the right end point REP are not present across the predicted traveling course RCR. The CPU selects the lateral position of one of the left end point LEP and the right end point REP of the selected obstacle having a smaller lateral distance as the correction gain calculation lateral position. The left end point LEP and the right end point REP of the obstacle are not present across the predicted traveling course RCR when the left end point LEP and the right end point REP of the obstacle are present in one of the region on the left side of the predicted traveling course RCR and the region on the right side of the predicted traveling course RCR. Accordingly, the CPU selects the obstacle of which the lateral position of the left end point LEP and the lateral position of the right end point REP both have positive values or negative values.

Step 1025: The CPU selects the obstacle of which the left end point LEP and the right end point REP are present across the predicted traveling course RCR. When the left end point LEP of the obstacle is positioned in the region on the left side of the predicted traveling course RCR, and the right end point REP of the obstacle is positioned in the region on the right side of the predicted traveling course RCR, the left end point LEP and the right end point REP are present across the predicted traveling course RCR. Thus, the CPU selects the obstacle of which the lateral position of the left end point LEP has a negative value and of which the lateral position of the right end point REP has a positive value. The CPU sets the correction gain calculation lateral position of the selected obstacle to "0".

When the left end point LEP and the right end point REP of the obstacle are present across the predicted traveling course RCR, it is assumed that the CPU selects the position of the end point having a smaller lateral distance as the correction gain calculation lateral position in the same manner as when the left end point LEP and the right end point REP of the obstacle are not present across the predicted traveling course RCR. In such a case, the CPU selects the lateral position of the closest end point to the predicted traveling course RCR as the correction gain calculation lateral position, and sets the correction gain G that corresponds to the correction gain calculation lateral position.

However, when the left end point LEP and the right end point REP of the obstacle are present across the predicted traveling course RCR, the obstacle is positioned on the predicted traveling course RCR and is considered to have the highest possibility of colliding with the host vehicle. Thus, the obstacle should be selected as the processing target obstacle regardless of the positions of the left end point LEP and the right end point REP. In other words, the correction gain calculation lateral position should be set to "0", and the minimum correction gain G should be set. In the assumption, the correction gain G is set to be greater than the correction gain G that should be set, and the obstacle may not be selected as the processing target obstacle even though the obstacle should be selected as the processing target obstacle.

Therefore, in the present embodiment, the CPU sets the correction gain calculation lateral position of the obstacle of which the left end point LEP and the right end point REP are present across the predicted traveling course RCR to "0". Accordingly, for the obstacle of which the left end point LEP and the right end point REP are present across the predicted traveling course RCR, the correction gain calculation lateral position "0" that should be set is set, and the minimum correction gain G is set. Accordingly, the correction gain G that should be set for the obstacle of which the left end point LEP and the right end point REP are present across the predicted traveling course RCR can be set.

After step 1025, the CPU executes the processes of steps 520 to 530 in order. That is, the CPU calculates the post-correction margin time period TTCg of each obstacle by correcting the margin time period TTC of each obstacle using the correction gain G corresponding to the correction gain calculation lateral position of each obstacle. The CPU selects the obstacle having the minimum post-correction margin time period TTCg as the processing target obstacle. Then, as described above, the CPU transitions to step 1095 to temporarily finish the present routine, and transitions to step 445 illustrated in FIG. 4.

By the process described heretofore, the lateral position of one of the left end point LEP and the right end point REP of the obstacle closer to the predicted traveling course RCR is used as the correction gain calculation lateral position. Accordingly, the correction gain G is set by considering the lateral width of the obstacle, and the possibility of selecting the obstacle having the highest possibility of colliding with the host vehicle SV as the processing target obstacle is further increased. Consequently, driver's line of sight is securely guided to the obstacle having the highest possibility of colliding with the host vehicle SV.

Next, the "process of selecting the processing target obstacle from a plurality of pedestrians" executed by the second apparatus will be described by using one example illustrated in FIG. 11. The example illustrated in FIG. 11 is the same situation as in FIG. 6, and all of the conditions established in FIG. 6 are established.

Both of "the pedestrian A and the pedestrian B" are extracted as the obstacle in step 425 in the same manner as FIG. 6. Thus, a "Yes" determination is made in step 435, and the processing target obstacle selection process is executed in step 440 (that is, the subroutine in FIG. 10).

Accordingly, in step 1005, the left end point LEP and the right end point REP of the pedestrian A are extracted. In step 1005, the left end point LEP and the right end point REP of the pedestrian B are extracted. Next, in step 1010, the left end point distance DL (distance Lc) of the pedestrian A is calculated, and the right end point distance DR (distance Ld) of the pedestrian A is calculated. In step 1010, the left end point distance DL (distance Le) of the pedestrian B is calculated, and the right end point distance DR (distance Lf) of the pedestrian B is calculated.

The left end point LEP and the right end point REP of the pedestrian A are positioned on the left side of the predicted traveling course RCR. Thus, in step 1015, the lateral position of the left end point LEP of the pedestrian A is "-Lc", and the lateral position of the right end point REP of the pedestrian A is "-Ld". The left end point LEP of the pedestrian B is positioned on the left side of the predicted traveling course RCR. Thus, in step 1015, the lateral position of the left end point LEP of the pedestrian B is "-Le". The right end point REP of the pedestrian B is positioned on the right side of the predicted traveling course RCR. Thus, in step 1015, the lateral position of the right end point REP of the pedestrian B is "Lf".

Both of the left end point LEP and the right end point REP of the pedestrian A are positioned on the left side of the predicted traveling course RCR and thus, are not present across the predicted traveling course RCR. The lateral distance "Ld" of the right end point REP of the pedestrian A is smaller than the lateral distance "Lc" of the left end point LEP of the pedestrian A. Accordingly, in step 1020, the lateral position "-Ld" of the right end point REP of the pedestrian A is selected as the correction gain calculation lateral position.

The lateral position "-Le" of the left end point LEP of the pedestrian B is a negative value, and the lateral position "Lf" of the right end point REP of the pedestrian B is a positive value. Thus, the left end point LEP and the right end point REP of the pedestrian B are present across the predicted traveling course RCR. Accordingly, in step 1025, the correction gain calculation lateral position of the pedestrian B is set to "0".

In step 520, based on the correction gain information 70, the correction gain G (=Gc) that corresponds to the correction gain calculation lateral position "-Lc" of the pedestrian A is set, and the correction gain G (=G0) that corresponds to the correction gain calculation lateral position "0" of the pedestrian B is set. As illustrated in FIG. 7, the correction gain G0 set for the pedestrian B is smaller than the correction gain Gc set for the pedestrian A. In step 525, the post-correction margin time period TTCg(A) of the pedestrian A and the post-correction margin time period TTCg(B) of the pedestrian B are calculated as follows.

$$TTCg(A)=Gc \cdot TTC(A)$$

$$TTCg(B)=G0 \cdot TTC(B)$$

Accordingly, the post-correction margin time period TTC(B) of the pedestrian B may be smaller than the post-correction margin time period TTC(A) of the pedestrian A in the same manner as FIG. 6. When the post-correction margin time period TTC(B) of the pedestrian B is smaller than the post-correction margin time period TTC(A) of the pedestrian A, the pedestrian B is selected as the processing target obstacle in step 530.

The present disclosure is not limited to the embodiments and can employ various modification examples within the scope of the present disclosure. In step 445, the first apparatus and the second apparatus may determine whether the post-correction margin time period TTCg of the processing target obstacle corrected in step 440 is less than or equal to the threshold T1th. Accordingly, the driver can be alerted at an appropriate timing based on the distance between the predicted traveling course RCR of the host vehicle and the center point CP or the closest point (any one of the left end point LEP and the right end point REP) of the processing target obstacle to the predicted traveling course RCR.

The sight line guiding icon 81 may have any design as long as having each function of guiding driver's line of sight described above.

In step 425, when the CPU extracts an obstacle from objects detected by the front radar sensor 12C, the CPU may extract an object that is "within the predicted traveling course region or is predicted to enter the predicted traveling course region and intersect with the tip end region of the host vehicle" as an obstacle regardless of whether or not the object is a pedestrian.

What is claimed is:

1. An in-vehicle alert apparatus comprising:
   an object information acquiring device configured to acquire object information related to a position of an object around a host vehicle with respect to the host vehicle and a relative speed of the object with respect to the host vehicle;
   a vehicle status information acquiring device configured to acquire vehicle status information related to a traveling status of the host vehicle;
   a display unit on which an alert screen that guides driver's line of sight in a direction of where a processing target obstacle is present is displayed; and
   an electronic control unit configured to
   estimate a predicted traveling course of a center point in a vehicle width direction of the host vehicle based on the vehicle status information,
   extract an object having a possibility of colliding with the host vehicle as an obstacle based on the object information and the predicted traveling course,
   calculate an index value based on at least the object information of each extracted obstacle, the index value being changed in accordance with a degree of need for an alert operation that alerts the driver to each extracted obstacle,
   select the processing target obstacle from the extracted obstacles by using the index value calculated for each extracted obstacle, and
   determine whether a specific condition is established, the specific condition being set to be established when the alert operation is needed in accordance with a result of comparison between the index value for the processing target obstacle and a predetermined threshold, and
   display the alert screen on the display unit when the electronic control unit determines that the specific condition is established, wherein
   the electronic control unit is configured to, when the electronic control unit extracts a plurality of the obstacles,
   execute, for each extracted obstacle, an operation of calculating a post-correction index value by calculating a distance between a specific point on the extracted obstacle and the predicted traveling course, setting the calculated distance as a correction lateral distance, and correcting the index value such that the degree of need for the alert operation indicated by the index value is increased as the correction lateral distance is decreased, and
   select the obstacle having the highest degree of need for the alert operation indicated by the post-correction index value as the processing target obstacle from the extracted obstacles.

2. The in-vehicle alert apparatus according to claim 1, wherein the electronic control unit is configured to use a point between one end point and another end point of the obstacle in a direction orthogonal to the predicted traveling course as the specific point.

3. The in-vehicle alert apparatus according to claim 1, wherein the electronic control unit is configured to use a closest point of the obstacle to the predicted traveling course in a direction orthogonal to the predicted traveling course as the specific point.

4. The in-vehicle alert apparatus according to claim 3, wherein the electronic control unit is configured to
   set the calculated distance as the correction lateral distance when the obstacle is not positioned across the predicted traveling course, and
   set the correction lateral distance to zero when the obstacle is positioned across the predicted traveling course.

5. The in-vehicle alert apparatus according to claim 1, wherein the electronic control unit is configured to
   calculate a margin time period as the index value, the margin time period being a time period in which the extracted obstacle comes into contact with or approaches a closest point to the host vehicle, and
   determine whether the specific condition is established, by determining whether the margin time period as the index value of the processing target obstacle is less than or equal to a threshold time period as the threshold.

6. The in-vehicle alert apparatus according to claim 5, wherein the electronic control unit is configured to
   acquire, based on the correction lateral distance, an index value correction gain that is decreased as the correction lateral distance is decreased,
   set, as the post-correction index value, a post-correction margin time period that is calculated by multiplying the margin time period by the index value correction gain, and
   select the obstacle having the smallest post-correction margin time period as the processing target obstacle from the extracted obstacles.

7. The in-vehicle alert apparatus according to claim 1, wherein the object information acquiring device includes a camera sensor that includes a vehicle-mounted stereo camera and an image processing device processing an image captured by the vehicle-mounted stereo camera, and a radar sensor that is configured to radiate an electric wave in a millimeter wave band, receive a reflective wave reflected by the object when the object is present within a radiation range of a millimeter wave, and detect a distance between the host vehicle and the object, a direction of the object with respect to the host vehicle, and the relative speed of the object with respect to the host vehicle based on the reflective wave.

8. The in-vehicle alert apparatus according to claim 1, wherein the vehicle status information acquiring device includes a vehicle speed sensor that is configured to detect a speed of a vehicle body of the host vehicle, an acceleration sensor that is configured to detect an acceleration of the host vehicle in a front-rear direction and a right-left direction in a horizontal direction, a yaw rate sensor that is configured to detect a yaw rate of the host vehicle, and a steering angle sensor that is configured to detect a steering angle of a steering wheel of the host vehicle.

* * * * *